(12) United States Patent
Zador et al.

(10) Patent No.: US 8,204,131 B2
(45) Date of Patent: Jun. 19, 2012

(54) METHOD AND SYSTEM FOR RAPID AND SMOOTH SELECTION OF DIGITALLY COMPRESSED VIDEO PROGRAMS

(75) Inventors: Andrew Michael Zador, Kitchener (CA); Vadim M. Kustov, Oakville (CA); Louie Lee, Toronto (CA)

(73) Assignee: Qualcomm Incorporated, San Diego, CA (US)

( * ) Notice: Subject to any disclaimer, the term of this patent is extended or adjusted under 35 U.S.C. 154(b) by 1477 days.

(21) Appl. No.: 11/331,281

(22) Filed: Jan. 13, 2006

(65) Prior Publication Data

US 2007/0064811 A1 Mar. 22, 2007

Related U.S. Application Data

(60) Provisional application No. 60/643,729, filed on Jan. 13, 2005.

(51) Int. Cl.
*H04N 7/12* (2006.01)
*H04N 11/02* (2006.01)
*H04N 11/04* (2006.01)

(52) U.S. Cl. .................................. 375/240.25

(58) Field of Classification Search ............. 375/240.01, 375/240.03, 240.08, 240.12, 240.13, 240.16, 375/240.25, 240.26; 725/38, 74, 82, 117, 725/131, 147, 151
See application file for complete search history.

(56) References Cited

U.S. PATENT DOCUMENTS

| | | | | |
|---|---|---|---|---|
| 5,559,808 A | * | 9/1996 | Kostreski et al. ............. | 370/517 |
| 5,999,694 A | * | 12/1999 | Yasuda et al. ................. | 386/349 |
| 6,052,554 A | * | 4/2000 | Hendricks et al. ............ | 725/109 |
| 6,115,080 A | * | 9/2000 | Reitmeier ..................... | 348/731 |
| 6,728,965 B1 | | 4/2004 | Mao | |
| 7,142,255 B2 | * | 11/2006 | Nohrden ........................ | 348/725 |
| 2002/0196850 A1 | * | 12/2002 | Liu et al. .................. | 375/240.12 |
| 2003/0016754 A1 | * | 1/2003 | Gandhi et al. ........... | 375/240.24 |
| 2003/0063675 A1 | * | 4/2003 | Kang et al. ............... | 375/240.26 |
| 2003/0076435 A1 | * | 4/2003 | Sato ........................ | 348/333.11 |
| 2003/0123537 A1 | * | 7/2003 | Yona et al. ............... | 375/240.01 |
| 2003/0233656 A1 | | 12/2003 | Sie et al. | |
| 2003/0235249 A1 | * | 12/2003 | Zhao et al. ............... | 375/240.13 |
| 2004/0190617 A1 | * | 9/2004 | Shen et al. ............... | 375/240.16 |
| 2005/0047681 A1 | * | 3/2005 | Hori et al. ..................... | 382/305 |
| 2006/0020995 A1 | * | 1/2006 | Opie et al. ..................... | 725/117 |
| 2006/0075428 A1 | * | 4/2006 | Farmer et al. ................... | 725/38 |

OTHER PUBLICATIONS

International Search Report issued May 8, 2007.
Written Opinion—PCT/US2006/001265—ISA/US—Alexandria, VA—May 8, 2007.

* cited by examiner

*Primary Examiner* — David C. Payne
*Assistant Examiner* — Syed Haider
(74) *Attorney, Agent, or Firm* — Haynes and Boone, LLP (57) ABSTRACT

A system and method for rapid selection and viewing of video programs in digital video broadcasting are disclosed. In one example of the invention, a parser sorts the data stream from different video programs and the sorted data are then stored in a fast cache memory. There are at least two intra-coded frames per video program available for decoding in the cache memory, constituting at least one group of pictures. Upon selecting a video program, a decoder decodes data starting from the oldest intra-coded frame in the cache memory. Full motion video and accompanying audio of the new video program are therefore available immediately resulting in a seamless and aesthetically pleasing transition between video programs. Multiple decoders are used in other aspects of the invention to provide thumbnail videos of a group of video programs for visual program selection.

67 Claims, 6 Drawing Sheets

| VIEW BY | CHANNEL | PROGRAM | DESCRIPTION |
|---|---|---|---|
| CHANNEL | 122 | SOCCER | EPL, MAN U VS. CHELSEA |
| THEME | 123 | SOCCER | SERIE A, JUVENTUS VS. INTER |
| TITLE | 124 | SOCCER | LA LIGA, REAL VS. BARCA |
| | 125 | SOCCER | BUNDES, BAYERN VS. HAMBURG |
| | 126 | SOCCER | EREDIVISIE, AJAX VS. PSV |

△ VIEW BY    ☐ DATE    ◯ RETURN

FIG. 6
PRIOR ART

METHOD AND SYSTEM FOR RAPID AND SMOOTH SELECTION OF DIGITALLY COMPRESSED VIDEO PROGRAMS

CROSS-REFERENCE TO RELATED APPLICATIONS

This application claims the benefit under 35 U.S.C. 119(e) of U.S. Provisional Patent Application No. 60/643,729, filed Jan. 13, 2005, the contents of which are incorporated by reference herein.

FIELD

The embodiments described herein relate to rapid video program selection, and more specifically, to rapid and smooth transition between programs being switched in compressed digital television, as well as simultaneous multi-stream decoding.

BACKGROUND

Current digital video transmission systems employ compressed streams of video and audio data. The compressed video consists of groups of inter-coded pictures, or for short, group of pictures. A group of pictures (GOP) is a mixture of intra-coded frames (intra-frame compressed images), or for short, I-frames, where each frame is compressed on its own, and inter-frame-compressed video sequences, where encoded motions between frames are used to gain additional compression due to image similarity between adjacent frames. This second mode of compression typically necessitates waiting for a stand-alone compressed frame before the decompression of a video sequence can begin. In a multi-program stream environment, different programs of video present these stand-alone frames (known in MPEG-2 standard as "key-frames" or "I-frames" ) at different points in time. Therefore switching from one program to another is delayed by at least the waiting time required for a stand-alone frame of the selected program to arrive. Subsequent processing to decompress the stream adds a further delay to the switching of programs. Currently, the most widely used video compression standard is MPEG-2, although similar compression methods are used in other video codecs (e.g. MPEG-4, H.264, WM9 etc.). Most of these methods share the shortcomings of video latency caused by inter-frame compression.

As a result, current compressed video delivery systems (e.g. set-top boxes) require a long delay time to assemble and display the first frame and subsequent motion-video of a newly selected video program. At the instant of switching to another video program, the decompression process must wait for a completely self-contained, compressed still-image (e.g. an I-frame in the MPEG-2 stream) of the selected video program, and/or accumulate sufficient bit-stream data to create a complete frame from non-I-frame data in the stream.

Data streams are not collected for other compressed video programs, as typically, there is only processing capability for a single compressed stream in prior art set-top boxes. An exception to this situation occurs where "live" picture-in-picture is an option of the system, but this does not address the problem of slow program acquisition, or graphically based program selection (described below). Another exception is the case where multiple parallel decoders decompress all video programs in parallel—real-time (e.g. cable company head-ends), but this solution is excessive in computation, hardware and cost when applied purely to handling video program changing in a home environment. MPEG-2 I-frames usually occur roughly once every half-second per broadcast video program. A group of pictures (GOP)" must contain at least one I-frame, and is the smallest unit of MPEG-2 video access. Therefore the period between GOPs limits fast switching, or scanning up/down video programs, and rapid browsing is thus prevented in current systems.

It is therefore desirable to invent a system and method for rapid successive viewing of selected digital video programs, which is fast, fairly seamless, and permits smoother transitions between digital video programs. It is also desirable to be able to simultaneously view multiple "thumbnail" representations of a group of programs, to enable graphic program selection from an on-screen palette.

SUMMARY

The embodiments described herein provide in one aspect a video program selection method for use with a multi-program video receiver, said receiver continuously receiving a compressed bit-stream that includes a plurality of groups of inter-coded pictures, each group of inter-coded pictures being associated with a video program and including at least one intra-coded image and being associated with audio data, said method comprising:
  a. identifying the location of each intra-coded image in the compressed bit-stream,
  b. parsing the compressed bit-stream into multiple video program data streams,
  c. storing at least one most recent group of pictures and identifying one intra-coded image within the most recent group of pictures for each of the video program data streams and storing the associated audio data for each group of pictures,
  d. upon selection of a video program, decoding the new video program data stream beginning with the intra-coded image in (c), to display the video program data stream for the new video program and to play the associated audio, such that there is always a complete recent group of pictures and an intra-coded image available to be displayed instantly for each video program, and such that, upon the selection of a video program, there is a complete image displayed, followed immediately by full-motion video.

The embodiments described herein provide in another aspect, a video program selection system for use with a multi-program video receiver, said receiver continuously receiving a compressed bit-stream that includes a plurality of groups of inter-coded pictures, each group of inter-coded pictures being associated with a video program and including at least one intra-coded image, said system comprising:
  a. a parser for parsing the compressed bit-stream into multiple video program data streams,
  b. a cache memory for storing at least one most recent group of pictures for each video program data stream, and identifying one intra-coded image data within the most recent group of pictures for each of the video program data streams, and storing the associated audio data for each group of pictures,
  c. at least one decoder, for decoding a new video program data stream when a video program is selected, beginning with the intra-coded image in (b), to display the video program data for the new video program and to play the associated audio, such that there is always a complete recent group of pictures and an intra-coded image available to be displayed instantly for each video program, and such that, upon selection of a video program, there is a complete image displayed, followed immediately by full-motion video.

Further aspects and advantages of the embodiments described herein will appear from the following description taken together with the accompanying drawings.

BRIEF DESCRIPTION OF THE DRAWINGS

For a better understanding of the embodiments described herein and to show more clearly how they may be carried into effect, reference will now be made, by way of example only, to the accompanying drawings which show at least one exemplary embodiment, and in which.

It will be appreciated that for simplicity and clarity of illustration, elements shown in the figures have not necessary been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

It will be appreciated that for simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementation of the various embodiments described herein.

Figure 1:
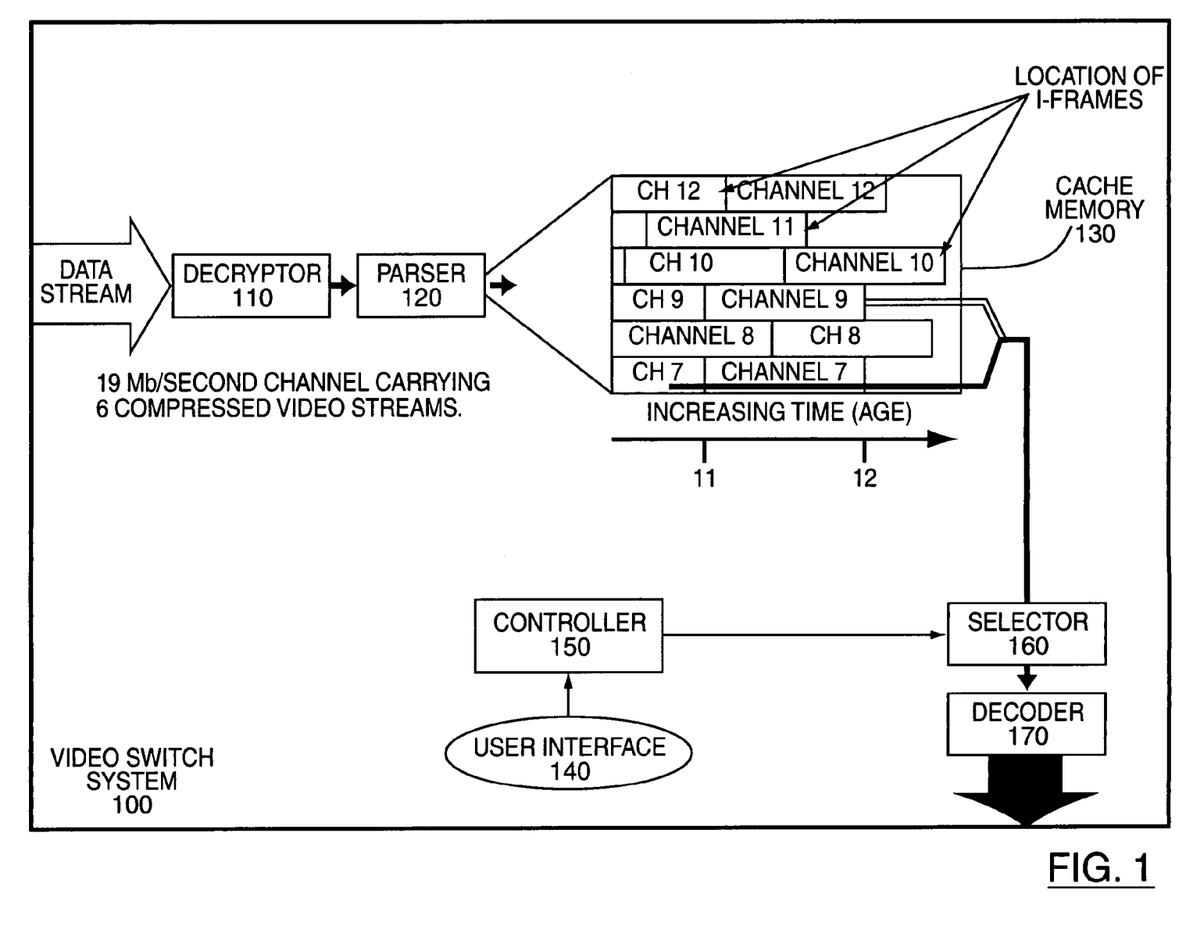
FIG. 1 is a graphical representation of an exemplary embodiment of a video switch system.

Reference is first made to FIG. 1 which shows an exemplary embodiment of a video switch system 100. Video switch system 100 comprises a decryptor 110, a parser 120, a cache memory 130, a user interface 140, a controller 150, a selector 160, and a decoder 170. Video switch system 100 is designed to rapidly access and display full-motion video from any digitally compressed video program in a multi-program broadcast stream while providing rapid and smooth switching of the digital video programs, a feature lacking in prior art systems.

Several interleaved streams of compressed, packetized video and audio arrive at decryptor 110, where any needed decryption of the data stream is performed. In case the data stream is not encrypted, the decryption is bypassed. In either case, non-encrypted data are then sent to parser 120.

Parser 120 separates the stream of data into different video programs and sorts these data according to video program. In addition, parser 120 locates and tags compressed I-frames and program clock reference (PCR) counters.

Figure 2:
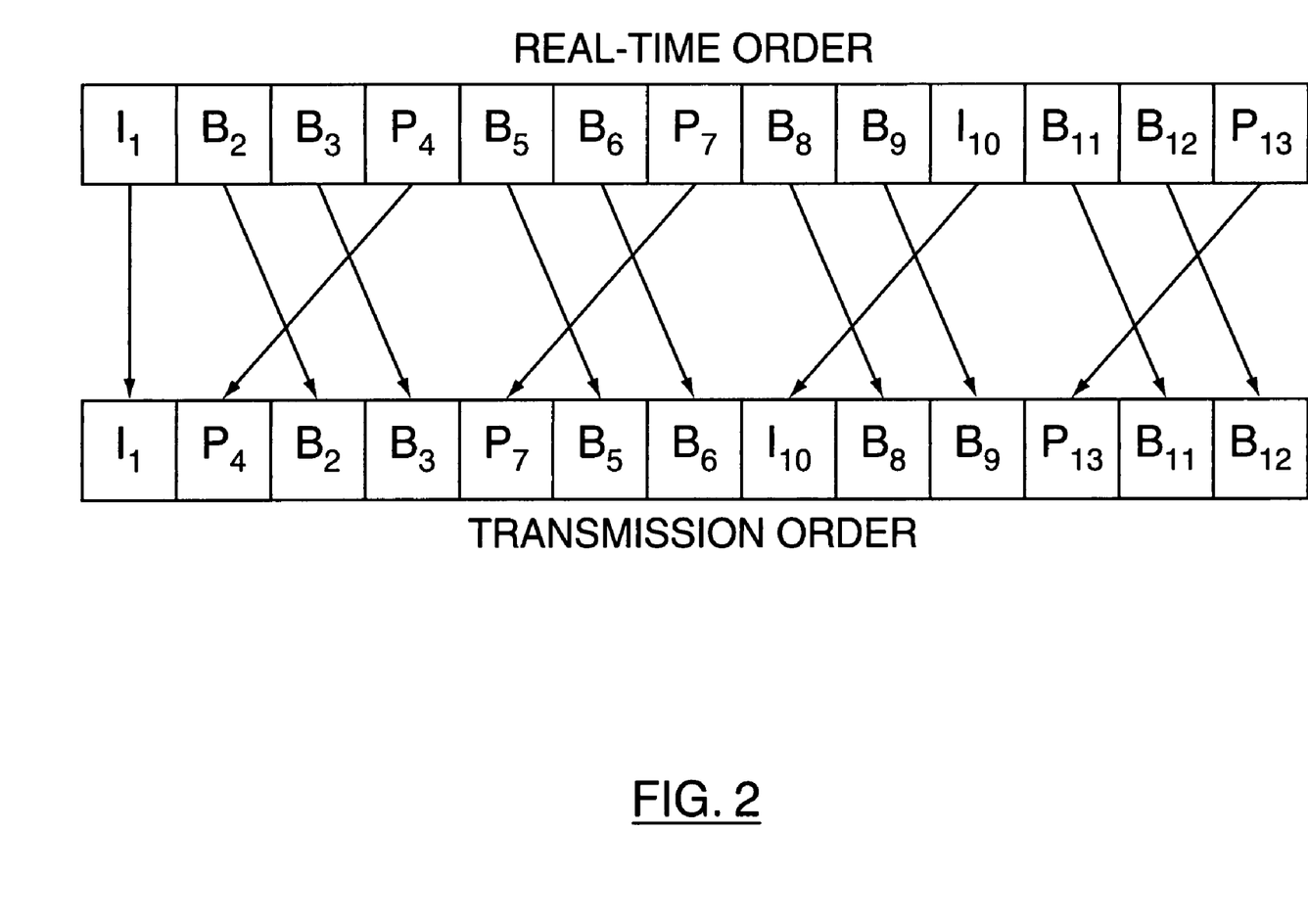
FIG. 2 is a graphical representation of an MPEG-2 video frame sequence.

To understand this process, reference is made to FIG. 2, which is a graphical representation of a generic MPEG-2 video frame sequence. FIG. 2 illustrates the structure of a group of pictures (GOP) that is the smallest unit of broadcast motion video and which is created from three different methods of frame processing, namely, intra-coded frames, or for short, I-frames, as well as P-frames, and B-frames. It should be noted that the word "frame" is used throughout this disclosure to refer to a single image, or a sequence of images, a classical frame of video consisting of two fields, a single field of an interlaced image, or one progressive classical frame.

I-frames are intra-coded (i.e. totally self-contained still-images like JPEG-compressed still-images). P-frames are motion-predicted from the previous frame, and B-frames are predicted bi-directionally from frames occurring temporally before or after, or both. This requires a re-ordering of the frame sequence before transmission. It should be noted that the existence of B-frames in a broadcast stream requires a re-ordering of the frame sequence before transmission. This, along with the fact that different transmitters begin GOPs at different times, in turn entails a variable delay between video programs in compressed digital streams.

When a scene motion results in an unmatched macroblock in a P- or B-frame (e.g. the motion was non-linear, too large, or lighting changed sufficiently), then a self-contained macroblock is embedded in the P- or B-frame in the case of MPEG-2. Other video compression standards have similar structure. This compressed video structure dictates that either the receiver waits for the next I-frame before decompression begins, or it permits the image to appear on screen by decoding only self-contained macroblocks as they are encountered in non-I-frames resulting in incomplete patches of the image appearing. In the first case, waiting for the next I-frame induces a variable delay between video programs in compressed digital streams, due to the fact that their I-frames are not aligned. Neither current solution is optimal.

It should however be noted that the MPEG-2 examples given throughout this disclosure and issues therewith, are common to all practical compressed digital video systems, and as such, video switch system 100 is equally applicable to other compressed digital video systems.

Parser 120 uses the PCR counter for synchronization, that is to establish the time when a particular video frame has to be displayed and a particular audio frame to be played.

In prior art video devices, the selection or switching of video programs typically results in a blank screen, which is gradually filled up, in blocks, to full screen motion video. The reason for the delay inherent in this behavior is the fact that the device has to wait for either the next I-frame, or for enough data stream to fill out all the "holes" on the screen resulting from missing block data. A P-frame or a B-frame has information about motion and, as such, cannot be used independently to establish a full screen image.

In contrast video switch system 100 provides for the sorting of the composite stream of compressed video programs by video program and storage in cache memory 130. In one exemplary embodiment cache memory 130 has sufficient capacity to maintain at least one GOP per video program. The compressed video data flows through cache memory 130 at compressed video rates. As shown in FIG. 1, cache memory 130 stores the sorted data on a FIFO basis. In this example implementation, maintaining at least one GOP containing at least one I-frame for each video program ensures the presence of an I-frame for the decoder to start from, at any instant, regardless of the selected video program.

Upon receiving the instruction from user interface 140, to switch to a different video program from the current one, controller 150 instructs selector 160 to locate a valid I-frame for the selected video program in cache memory 130 at which point decoder 170 begins decompressing that stream.

In one exemplary embodiment, video switch system 100 permits more than one GOP to be stored in cache for each video program and selector 160 looks for the oldest I-frame in cache memory 130. This exemplary embodiment ensures the existence of sufficient data, i.e., more than one GOP, so that the occurrence of an error forcing a freeze-frame in classical MPEG-2 systems, would only cause a less-noticeable jump to the next I-frame in the present system. This ability to jump over freezes is available until the cache has been exhausted of pending I-frames for the current video program. Video programs not currently being viewed can be allowed to accumulate GOPs for this purpose. The slight delay does not affect watching a video program, though it compounds half a second to one second of delay on the transmission delay in a standard MPEG-2 broadcast system.

Switching from one video program to another is essentially instant, and the video flow starts immediately after display of the first available frame of the newly selected video program. This process necessitates keeping track of locations of all relevant I-frames in the data stream to start the decoding from that location in the stream. The multiple I-frame per program requirement ensures that there are newer I-frames available for jumping-to in case of an error forcing a freeze-frame.

In this exemplary embodiment there is a variable positioning in cache memory 130 corresponding to a variable time lag with respect to "live broadcast" depending upon the selected video program. Despite the variable latency between video programs in the cache, the worst-case delay between selection of a video program and its full motion display, starting from a more or less latent point than the previous video program, is less than one frame, which is due to the time required to move the decoding pointer to the newly selected program's oldest I-frame in cache memory 130 plus the time required to decode that I-frame. In a more particular implementation, the one-frame delay is concealed by holding the last frame of the previous video program until the next stream is available for display. No additional decoder is required to accomplish this single video program switching.

In another exemplary embodiment, selector 160 looks for the most recent I-frame in cache memory 130. This exemplary embodiment reduces the decoding delay to between 0-0.5 second compounded on the transmission delay at the expense of a risk of lack of enough data for decoding and processing or jumping over freezes. In this example, selector 160 looks for the start codes that identify the beginning of the next frame after the most recent I-frame to establish that an entire I-frame is present. By identifying start codes and counting the number of bits, selector 160 guarantees that the decoder's input buffer requirements are met and therefore decoder 170 can start decoding instantaneously.

In both these exemplary embodiments, decoder 170 starts decoding the data stream relevant to the selected video program upon the selection of a particular valid I-frame, starting from that I-frame. A seamless and smooth switching between the two video programs results. Unlike prior art devices, there will be no blank screen or gradual tiling of image blocks at the moment of switching video programs, and full motion video will occur immediately. Video switch system 100 produces a full screen image and executes motion video immediately after switching of video programs.

Video switch system 100 further enables the display of multiple "thumbnails" (i.e. small images or motion video) or PIPs (pictures-in-picture) of video programs in a currently monitored group including user-selected (or favorite) video programs, a set of video programs adjacent to the current video program on both sides of it, or all of the available video programs on the system. To achieve this, decoder 170 decodes an I-frame, or the DC components thereof, from each video program in the currently monitored group. Decoding only the DC component of an I-frame produces a smaller sized image. When even smaller sized thumbnails are needed, the resulting images are then shrunk through sampling, or scaling, or any other appropriate methods known to those skilled in the art, and displayed. On the other hand, if the resulting thumbnails are rendered too small, they are expanded instead, using similar techniques. For fractional scales other than native transform block size, additional non-DC terms in the transform may be used to improve thumbnail resolution.

For additional thumbnail resizing, scaling, interpolation or any other method may be used, as known to those skilled in the art. There is no need for an additional decoder or increased computational power since the thumbnails are sub-sampled and, if necessary, less frequently updated depending upon the processing power of decoder 170. This function allows immediate visual selection of any video program in the group by highlighting the relevant thumbnail. As soon as a thumbnail is highlighted, selector 160 instructs decoder 170 to immediately decode data from an I-frame in the data stream. Audio from the highlighted video program can be optionally played immediately. Upon selection of the highlighted thumbnail, the system displays the full-screen motion video of the new video program with accompanying audio, via one of the methods explained above.

Figure 3:
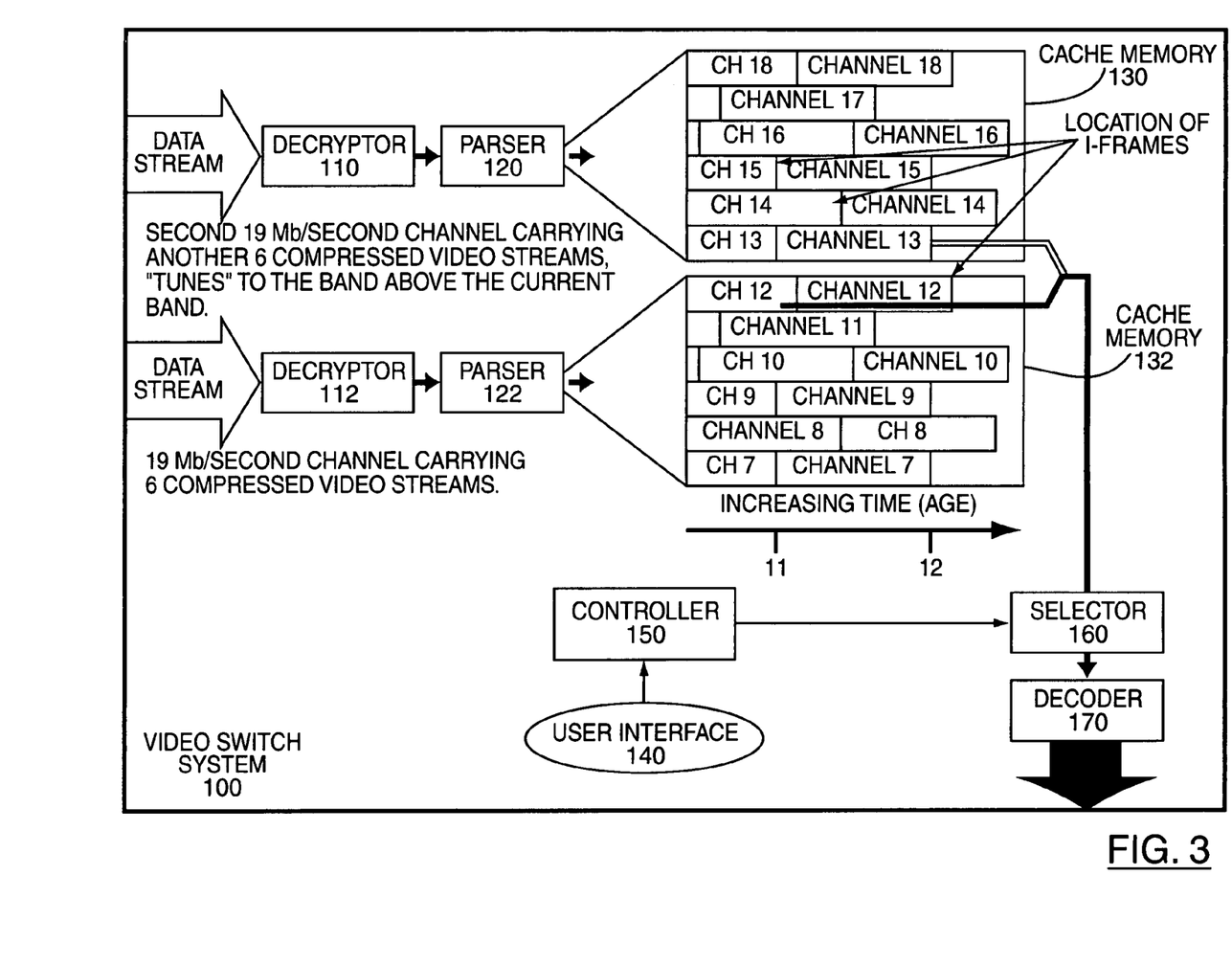
FIG. 3 is a graphical representation of another exemplary embodiment of a video switch system.

FIG. 3 illustrates another example embodiment of the video switch system 100. This implementation is used for what is known as "program surfing". FIG. 3 outlines the elements required to rapidly and sequentially access and display full-motion video from any number of digitally compressed video programs in a multi-program broadcast system. In this example embodiment two cache memories 130 and 132 are used to ensure continuous and smooth "program surfing" for a user. Each of the two cache memories 130 and 132 store data from a different block of video programs. When the user surfs past the middle program of a block of video programs in either direction within cache memory 130, cache memory 132 starts downloading stream data from the adjacent block of video programs in the same direction of program scanning. This ensures the continuation of smooth transitions between video programs while surfing.

In another exemplary embodiment a set of video programs is stored symmetrically about the currently displayed video program. As the user scans up or down through the video programs linearly, video switch system 100 acquires a frame from the next video program beyond the current set, above or below the current group of programs respectively, dropping the furthest video program's frame from the list. Visual video program selection from a menu of thumbnails, based on image content in this manner, is faster, more reliable, and random-access friendly, unlike sequential surfing. It is also simpler and more intuitive than pressing video program numbers, especially in a dark room. The thumbnails are decoded and displayed as still-images in one example of the present invention. In another example, the thumbnail images 200 are refreshed at every I-frame or displayed as motion-video, with minimal processing, by only decoding the DC terms or the first few frequency components of the macro-blocks and the constrained motion compensation information.

Figure 4A:
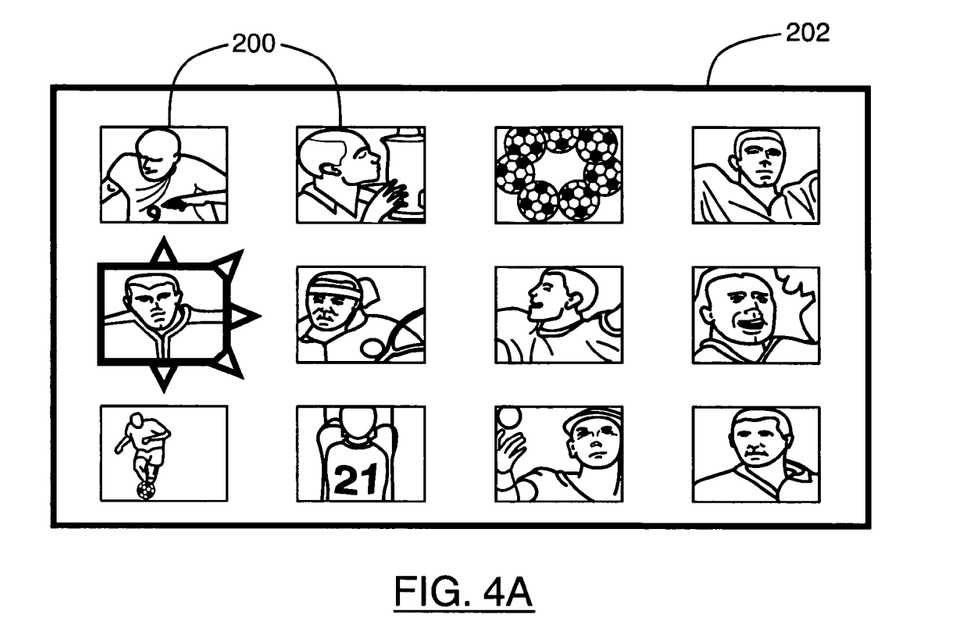
FIG. 4A is a graphical representation of an exemplary visual on-screen thumbnail program selection guide generated by a video switch system built in accordance with the present invention.

FIG. 4A shows another exemplary embodiment of video switch system 100 where thumbnail images 200 of a group of video programs are being displayed using a visual on-screen thumbnail program selection guide on a television screen 202. In this way, the television screen 202 shows a dozen motion videos of a user's favorite sports video programs. A user highlights and then selects any of these displayed video programs. The left central thumbnail image 200 is shown highlighted in FIG. 4A.

The user navigates through these thumbnail images 200 to select a video program for viewing. Cache memory 130 keeps at least one GOP for each of these video programs to enable proper decoding. Decoder 170 sub-samples the frames in the motion video of these thumbnails and, if necessary, at a lower frame rate than a regular full-screen video program. This arrangement ensures that a single decoder can process all the data to display motion video thumbnails. Accordingly, a single decoder is capable of decoding all the displayed video programs. Alternatively, a sufficiently rapid decoder is employed to permit full frame-rate decoding for several simultaneous video programs.

Figure 4B:
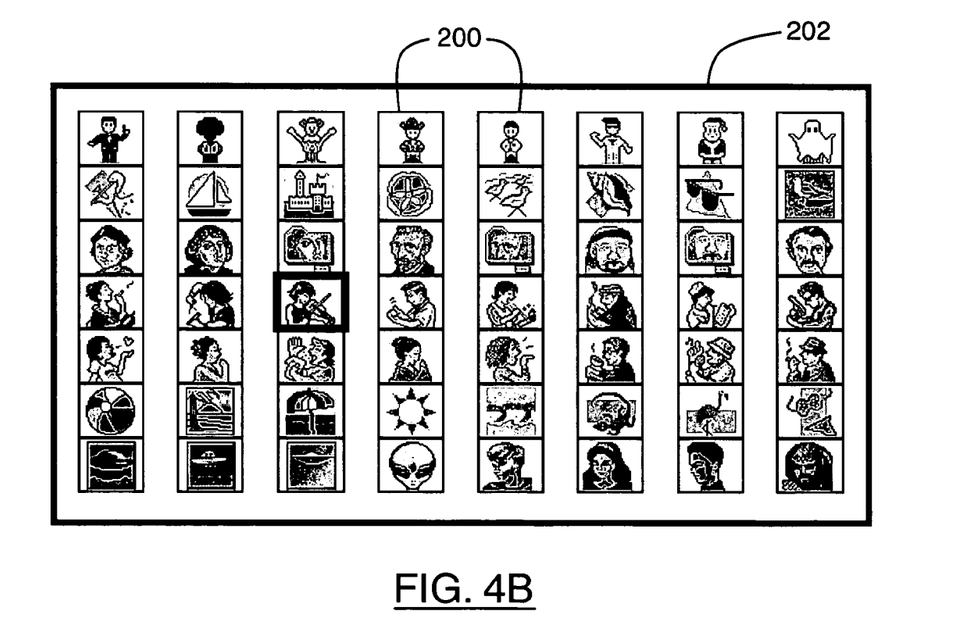
FIG. 4B is graphical representation of an another exemplary visual on-screen thumbnail program selection guide generated by the video switch system where all the available programs are shown on the screen for graphical program selection.

FIG. 4B illustrates another exemplary embodiment of the video switch system 100 and where (similar to the arrangement shown in FIG. 4A), all the available video programs are displayed for selection using a visual on-screen thumbnail program selection guide on a television screen 202. The user is provided with the opportunity to conduct graphical program selection using a plurality of thumbnail images 200. A thumbnail image 200 in the fourth row and third column is shown highlighted in FIG. 4B. A user can easily navigate through these thumbnail images 200 one column or one row at a time or jump many rows or many columns. In the case where all thumbnail images 200 do not fall within the same screen, page-down and page-up functions are added for easier navigation. Changing video programs graphically is much easier than entering numbers, especially in a dark room. In this exemplary embodiment, thumbnail images 200 are displayed using further sub-sampling and with lower frame update rates to ensure that a single decoder is capable of decoding all the displayed video programs. Alternatively, a sufficiently rapid decoder is employed to permit full frame-rate decoding for the maximum number of simultaneously displayed video programs.

Figure 5A:
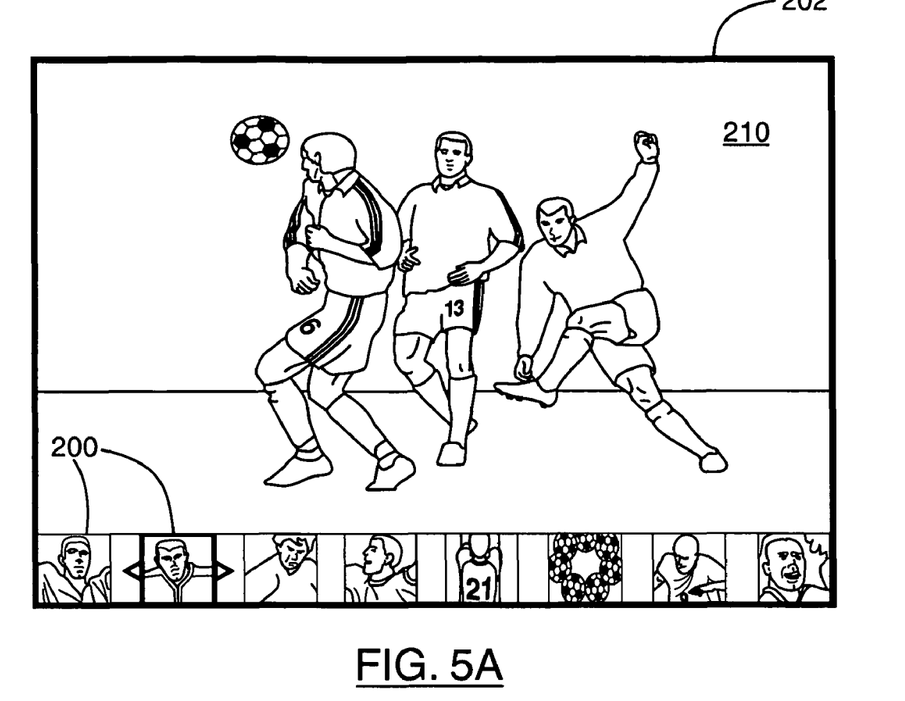
FIG. 5A is a graphical representation of another exemplary visual on-screen thumbnail program selection guide generated by the video switch system.
Figure 5B:
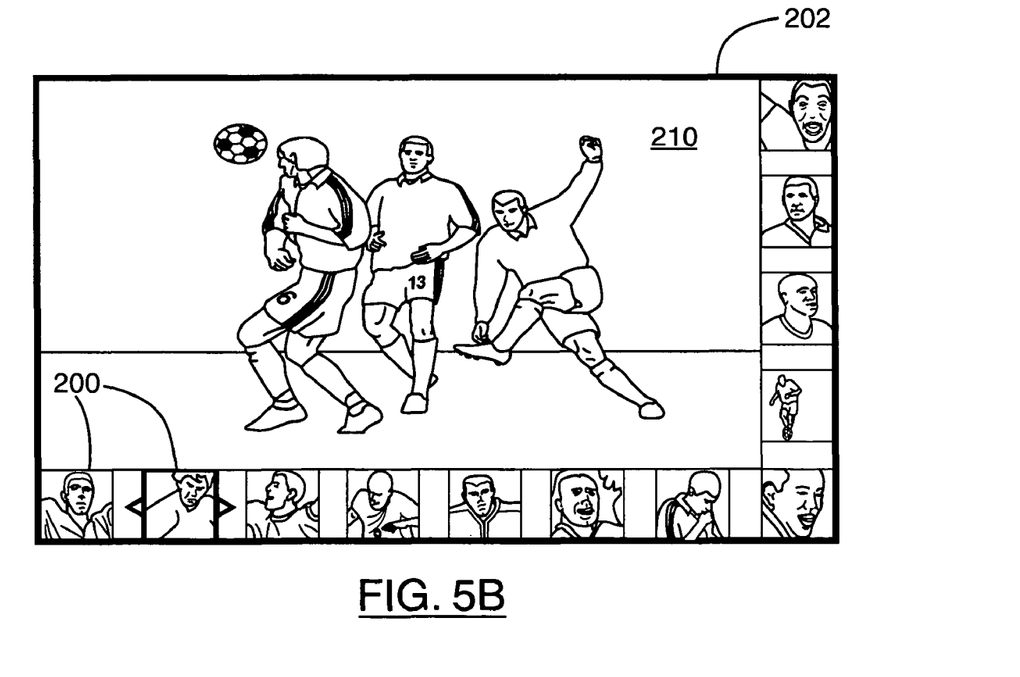
FIG. 5B is a graphical representation of another exemplary visual on-screen thumbnail program selection guide generated by the video switch system.

FIGS. 5A and 5B illustrate additional exemplary embodiments of the video switch system 100 where similar to FIG. 4A and FIG. 4B, one video program 210 is displayed and additional programs from the same group are shown as thumbnail images 200 within an on-screen thumbnail program selection guide on a television screen 202 for graphical program selection by the user.

As shown in FIG. 5A, the second thumbnail from left is currently highlighted and ready for selection. The group of thumbnail images 200 could be alternatively situated on the right or left of the screen as columns. Alternatively, as shown in FIG. 5B, the thumbnail images 202 could be situated on the right as a column and at the bottom as a row so as to maintain the aspect ratio of the currently displayed program. Accordingly, it is contemplated that the thumbnail images 200 can be located on a row or equivalently on a column or both, next to the video program currently being viewed. The user can then select any of these video programs once they are highlighted as shown FIGS. 5A and 5B. In this example the thumbnails are sub-sampled and decoded at a much slower frame rate so as to not disrupt the decoding of the currently displayed video program using a classical single program decoder 170.

Another exemplary embodiment of video switch system 100 is directed at the situation where the aspect ratio of the currently displayed video program does not match that of the display system. In this case there will be unused screen area 202 either on the top and bottom (16:9 video shown on a 4:3 screen) or on the two sides (4:3 video shown on a 16:9 screen). In this example of the invention, the unused portion of the screen is used to display thumbnail images 200 or videos of a group of video programs. In this exemplary embodiment only I-frames are decoded for displaying the thumbnails. This arrangement reduces the storage requirement of cache memory 130 and reduces the computational power needs of decoder 170, However, in order to make the video program selection rapid and seamless, as soon as a thumbnail image 200 is highlighted, cache memory 130 immediately starts storing the full data stream for that highlighted program. This ensures that, as soon as the highlighted thumbnail image 200 is selected, there is enough data for decoding, starting with a valid I-frame.

In any of the above examples, the thumbnail images 200 within the on-screen thumbnail program selection guide could be associated with accompanying program numbers or other text such as the name of the show or any other description.

Figure 6:
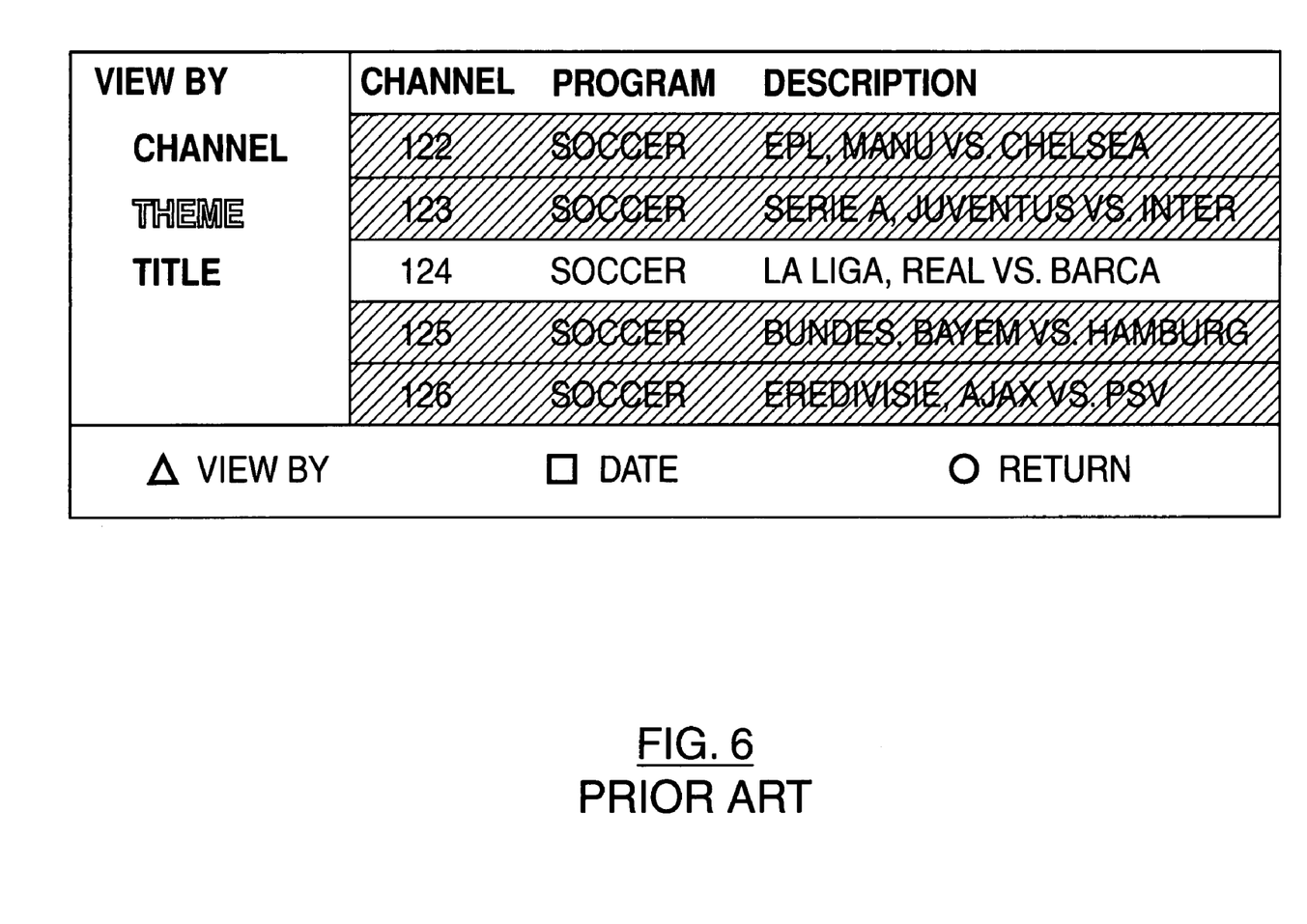
FIG. 6 shows an on-screen menu for a text-based program guide.

The usefulness of the video switch system 100 becomes more apparent when compared to the prior art devices currently available. FIG. 6 shows a typical prior art on-screen menu 212 for a text-based program guide. The video program on channel 124 is currently highlighted and ready for selection. It could be appreciated how much easier it is to choose a video program graphically from the on-screen thumbnail program selection guide, compared with the cumbersome task of reading all the text excerpts for different video programs one by one. Also, due to cable and satellite program reordering, a given video program may not keep the same number from one system to the next, while its audio-visual content will remain the same. Moreover, the selection of a given video program from a text representation, as explained above, does not yield a rapid and seamless switching of video programs. Both of these issues are addressed in the present disclosure, for the clarity of which, the following objects and operation modes are added.

Video switch system 100 has many advantages over the prior art. A first advantage of the present invention is the reduction of perceived visual delay induced when switching between compressed digital motion-video sources.

A second advantage of video switch system 100 is the facilitation of rapid program browsing, sequential surfing, and random program selection in compressed digital video receiver systems.

A third advantage of video switch system 100 is to provide the feature of multiple, motion-video pictures-in-picture simultaneously without substantially increasing the required computational power of the decoder.

A fourth advantage of video switch system 100 is the enabling of fast graphically-based, on-screen program selection by scene content, from a palette of video programs.

In operation of video switch system 100, the user would employ a hand-held remote control or front-panel controls on a set-top box, DVD player, television, or similar device to select or activate various functions, possible variants of which are described below by way of example only.

Pressing of up-program or down-program buttons would enable perceptually rapid sequential switching from one program to the next in the selected program-scanning "direction", where the video programs are viewed classically as a linear one-dimensional array, and the "direction" is one of two possible orientations along this array of programs. The selected video program would display full motion video with accompanying synchronized audio with almost no delay. Selection of a video program by input of an associated program number or other identifier would similarly result in rapid full-screen access to that program's video with synchronized audio.

Selection by a specific function button, to display one or more on-screen reduced-size pictures-in-picture would result in a picture (or pictures) from subsequently selected program(s) being placed on the display, overlaid onto area(s) of the current program's picture. In a preferred embodiment, display of these reduced-size program(s) would involve substantially less computational complexity than full-screen video, permitting instant motion-video (possibly at a reduced frame rate).

Selection by a specific function button, of "graphic program selection mode" would result in the on-screen display, of a set of video pictures-in-picture of a group of video programs. Subsequent use of cursor buttons to move a selector from one video program's picture to another, in two dimensions, would specify a chosen video program, and pressing a selector button would replace the current full-screen program with full-screen video of the chosen video program, accompanied by the removal of the set of selectable overlaid thumbnails. Unlike the linear array model of video programs above, this program model is of a two-dimensional array without necessity of specific program numbering.

The pool of video programs immediately available for such graphic selection is envisioned to be one of the following (depending upon prior user-defined, or system-specific conditions): a set of user-pre-selected video programs from the entire received set of programs; a set of programs adjacent-to and on either side of the current full-screen video program in a numbered linear array model; or all of the available programs on the system. These video programs would be displayed on-screen as a set of "thumbnail" images 200, in a one- or two-dimensional array, with or without motion-video, depending upon the configuration, amount of memory, and processing power available to the system.

Overlaid video programs, whether displayed for viewing as pictures-in-picture, or for subsequent possible program changing, could be individually added or deleted by use of "Add thumbnail" or Remove thumbnail" buttons. All overlaid pictures could be removed by use of a "Clear Thumbnails" button.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A video program selection method for use with a multi-program video receiver, said receiver continuously receiving a compressed bit-stream that includes a plurality of groups of inter-coded pictures, each group of inter-coded pictures being associated with a video program and including at least one intra-coded image and being associated with audio data, said method comprising:
   a. identifying the location of each intra-coded image in the compressed bit-stream,
   b. parsing the compressed bit-stream into multiple video program data streams,
   c. storing at least one most recent group of pictures and identifying at least two intra-coded images having a clock reference, within the most recent group of pictures for each of the video program data streams and storing the associated audio data for each group of pictures,
   d. upon selection of a video program, decoding the new video program data stream beginning with the oldest intra-coded image in (c), to display the video program data stream for the new video program and to play the associated audio,
   such that there is always a complete recent group of pictures and an intra-coded image available to be displayed instantly for each video program, and such that, upon the selection of a video program, there is a complete image displayed, followed immediately by full-motion video.

2. The method of claim 1, wherein if a video program is first highlighted, then further decoding the new video program data stream from the time of highlighting, starting from a recent intra-coded image, such that when the highlighted program is selected, instant and contiguous motion video is displayed accompanied by playing the associated audio.

3. The method of claim 2, wherein the decoding of a group of pictures for a plurality of video program data streams is anticipated in order to make a group of pictures available for the anticipated video program, the anticipation being based on one of: the direction of sequential program highlighting from a list of programs and a locality highlighted in an array of programs.

4. The method of claim 3, wherein the new video program is highlighted by highlighting one of: text means and graphical means associated with the new video program data stream.

5. The method of claim 1, wherein data for at least two most recent intra-coded images are stored for each video program data stream to ensure that at least one complete group of pictures is available for decoding to ensure contiguous motion video upon selecting a different video program.

6. The method of claim 1, further decoding the most recent intra-coded image data from a group of video programs, and displaying these intra-coded images, as thumbnail images in a thumbnail image area on a screen, and wherein any thumbnail image can be visually highlighted, and wherein the video program indicated by the highlighted thumbnail image can be subsequently selected.

7. The method of claim 6, further comprising continuously updating each video program thumbnail image with its most recent intra-coded image.

8. The method of claim 6 further comprising decoding and displaying the associated video for each video program in the corresponding thumbnail image area with at least one of a lower resolution and a lower refresh rate, thereby displaying a corresponding thumbnail video.

9. The method of claim 8, wherein a currently displayed video program is displayed on a screen and further comprising arranging and displaying the thumbnail videos in the perimeter of the currently displayed program video.

10. The method of claim 9, wherein a plurality of thumbnail videos are arranged within the perimeter of the displayed video program such that the original aspect ratio of the displayed video program is maintained.

11. The method of claim 9, wherein the aspect ratio of a screen and the aspect ratio of the displayed video program do not match, leaving unused screen area, and wherein the thumbnail videos are arranged in the unused area of the screen.

12. The method of claim 8, further initiating decoding of the data from a highlighted video program upon highlighting the corresponding thumbnail video, to ensure instant and contiguous motion video when the highlighted video program is selected.

13. The method of claim 8, wherein the thumbnail videos are selected from one of: user preferred video programs, sequential video programs in the data, nearest neighbor video programs in the data, and similarly classified video programs.

14. The method of claim 8, further initiating the decoding of groups of pictures from a group of video program data streams based on the direction of the movement of the selection highlight in a two-dimensional array of thumbnail videos.

15. A multi-program video receiver, said receiver continuously receiving a compressed bit-stream that includes a plurality of groups of inter-coded pictures, each group of inter-coded pictures being associated with a video program and including at least one intra-coded image, said receiver comprising:
   a. a parser for parsing the compressed bit-stream into multiple video program data streams,
   b. a cache memory for storing at least one most recent group of pictures for each video program data stream, and identifying at least two intra-coded images having a clock reference, within the most recent group of pictures for each of the video program data streams, and storing the associated audio data for each group of pictures,
   c. at least one decoder, for decoding a new video program data stream when a video program is selected, beginning with the oldest intra-coded image in(b), to display the video program data for the new video program and to play the associated audio,
   such that there is always a complete recent group of pictures and an intra-coded image available to be displayed instantly for each video program, and such that, upon selection of a video program, there is a complete image displayed, followed immediately by full-motion video.

16. The receiver of claim 15, including at least two decoders for decoding the video program data stream for at least two adjacent groups of video programs in the compressed bit-stream to ensure immediate and contiguous sequential video program selection.

17. The receiver of claim 15, wherein a plurality of decoders are adapted to decode a plurality of video program data streams to ensure immediate and contiguous random program selection from a plurality of video programs.

18. The receiver of claim 15, wherein the receiver initiates decoding of a new video program data stream when the new video program is highlighted, starting from a recent intra-coded image, such that when the highlighted video program is selected, instant and contiguous motion video is displayed accompanied by playing the associated audio.

19. The receiver of claim 18, wherein the decoding of a group of pictures of a video program data stream from a plurality of video programs is anticipated by the receiver in order to make a group of pictures available for the anticipated video program, the anticipation being based on one of: the direction of sequential program highlighting from a list of video programs, and a location of a highlighted video program in an array of video programs.

20. The receiver of claim 19, wherein the new video program is highlighted by highlighting one of: text means and graphical means associated with the new video program.

21. The receiver of claim 15, wherein data for at least two recent intra-coded images are stored per video program to ensure that at least one complete group of pictures is available for decoding to ensure contiguous motion video upon selection of a different video program.

22. The receiver of claim 15, further adapted to decode the most recent intra-coded image data from a group of video programs, and display these intra-coded images, as thumbnail images in a thumbnail image area on a screen, and wherein any thumbnail image can be highlighted by visual means, and wherein the video program associated with the highlighted thumbnail image can be subsequently selected.

23. The receiver of claim 22, further adapted to continuously update the thumbnail image associated with each video program with its latest intra-coded image.

24. The receiver of claim 22 further adapted to decode and display the associated video for each video program in the corresponding thumbnail image area with at least one of lower resolution and lower refresh rate, thereby displaying a corresponding thumbnail video.

25. The receiver of claim 24, further adapted to arrange and display a plurality of the thumbnail videos in the perimeter of a currently displayed video program.

26. The receiver of claim 25, further adapted to arrange the thumbnail videos in the perimeter of the displayed video program such that the original aspect ratio of the displayed video program is maintained.

27. The receiver of claim 25, wherein the aspect ratio of a screen and the aspect ratio of the displayed video program do not match, leaving unused screen area, and wherein the receiver is adapted to arrange the thumbnail videos in the unused area of the screen.

28. The receiver of claim 24, further adapted to initiating decoding of a video program data stream when the corresponding thumbnail video is highlighted, to ensure instant and contiguous motion video upon selection of the highlighted video program.

29. The receiver of claim 24, wherein the thumbnail videos are selected from one of: user preferred video programs, sequential video programs in the data, nearest neighbor video programs in the data, and similarly classified video programs.

30. The receiver of claim 24, further adapted to initiate the decoding of groups of pictures from a group of video program data streams based on the direction of the movement of the selection highlight over thumbnail videos in a two-dimensional array of thumbnail videos.

31. A video program selection method for use with a video receiver comprising the steps of:
   receiving a compressed bit-stream including a plurality of groups of inter-coded pictures having intra-coded images;
   identifying the location of each intra-coded image in the compressed bit-stream;
   parsing the compressed bit-stream into each group of the plurality of groups of inter-coded pictures having intra-coded images,
   storing at least one of the plurality of groups of inter-coded pictures to form a stored group of pictures and identifying at least two intra-coded images having a clock reference, with a video program data stream;
   selecting a group of pictures from the stored group of pictures;

displaying the video program data stream from the selected group of pictures, beginning with the oldest intra-coded image;

maintaining at least one of the plurality of groups of inter-coded pictures other than the selected group of pictures.

32. The method of claim 31 wherein each group of inter-coded pictures is associated with a video program.

33. The method of claim 31 wherein the compressed bit stream includes audio data associated to each group of pictures, and the storing at least one group of pictures comprises storing the associated audio data for the group of pictures.

34. A non-transitory readable medium comprising instructions which when executed by a multi-program video receiver, the receiver continuously receiving a compressed bit-stream that includes a plurality of groups of inter-coded pictures, each group of inter-coded pictures being associated with a video program and including at least one intra-coded image, cause the receiver to perform:
identifying the location of each intra-coded image in the compressed bit-stream,
parsing the compressed bit-stream into multiple video program data streams,
storing at least one most recent group of pictures and identifying at least two intra-coded images having a clock reference, within the most recent group of pictures for each of the video program data streams and storing the associated audio data for each group of pictures,
upon selection of a video program, decoding the new video program data stream beginning with the oldest intra-coded image having a clock reference, to display the video program data stream for the new video program and to play the associated audio,
such that there is always a complete recent group of pictures and an intra-coded image available to be displayed instantly for each video program, and such that, upon the selection of a video program, there is a complete image displayed, followed immediately by full-motion video.

35. The non-transitory readable medium of claim 34 further comprising instructions which when executed by the receiver cause the receiver to, if a video program is first highlighted, decoding the new video program data stream from the time of highlighting, starting from a recent intra-coded image, such that when the highlighted program is selected, instant and contiguous motion video is displayed accompanied by playing the associated audio.

36. The non-transitory readable medium of claim 35 further comprising instructions which when executed by the receiver cause the receiver to anticipate the decoding of a group of pictures for a plurality of video program data streams in order to make a group of pictures available for the anticipated video program, the anticipation being based on one of: the direction of sequential program highlighting from a list of programs and a locality highlighted in an array of programs.

37. The non-transitory medium of claim 36 further comprising instructions which when executed by the receiver cause the receiver to highlight the new video program by highlighting one of: text means and graphical means associated with the new video program data stream.

38. The non-transitory medium of claim 34 further comprising instructions which when executed by the receiver cause the receiver to store data for at least two most recent intra-coded images for each video program data stream to ensure that at least one complete group of pictures is available for decoding to ensure contiguous motion video upon selecting a different video program.

39. The non-transitory medium of claim 34 further comprising instructions which when executed by the receiver cause the receiver to further decoding the most recent intra-coded image data from a group of video programs, and displaying these intra-coded images, as thumbnail images in a thumbnail image area on a screen, and wherein any thumbnail image can be visually highlighted, and wherein the video program indicated by the highlighted thumbnail image can be subsequently selected.

40. The non-transitory medium of claim 39 further comprising instructions which when executed by the receiver cause the receiver to continuously updating each video program thumbnail image with its most recent intra-coded image.

41. The non-transitory medium of claim 36 further comprising instructions which when executed by the receiver cause the receiver to decoding and displaying the associated video for each video program in the corresponding thumbnail image area with at least one of a lower resolution and a lower refresh rate, thereby displaying a corresponding thumbnail video.

42. The non-transitory medium of claim 41 further comprising instructions which when executed by the receiver cause the receiver, wherein a currently displayed video program is displayed on a screen to arrange and to display the thumbnail videos in the perimeter of the currently displayed program video.

43. The non-transitory medium of claim 42 wherein a plurality of thumbnail videos are arranged within the perimeter of the displayed video program such that the original aspect ratio of the displayed video program is maintained.

44. The non-transitory medium of claim 42 further comprising instructions which when executed by the receiver cause the receiver, wherein the aspect ratio of a screen and the aspect ratio of the displayed video program do not match, to leave unused screen area, and wherein the thumbnail videos are arranged in the unused area of the screen.

45. The non-transitory medium of claim 41 further comprising instructions which when executed by the receiver cause the receiver to initiate decoding of the data from a highlighted video program upon highlighting the corresponding thumbnail video, to ensure instant and contiguous motion video when the highlighted video program is selected.

46. The non-transitory medium of claim 41 wherein the thumbnail videos are selected from one of: user preferred video programs, sequential video programs in the data, nearest neighbor video programs in the data, and similarly classified video programs.

47. The non-transitory medium of claim 41, further comprising instructions which when executed by the receiver cause the receiver to initiate the decoding of groups of pictures from a group of video program data streams based on the direction of the movement of the selection highlight in a two-dimensional array of thumbnail videos.

48. A non-transitory readable medium comprising instructions which when executed by a video receiver cause the video receiver to perform:
receiving a compressed bit-stream including a plurality of groups of inter-coded pictures having intra-coded images;
identifying the location of each intra-coded image in the compressed bit-stream;
parsing the compressed bit-stream into each group of the plurality of groups of inter-coded pictures having intra-coded images,
storing at least one of the plurality of groups of inter-coded pictures to form a stored group of pictures and identifying at least two intra-coded images having a clock reference, with a video program data stream;

selecting a group of pictures from the stored group of pictures;

displaying the video program data stream from the selected group of pictures, beginning with the oldest intra-coded image; and maintaining at least one of the plurality of groups of inter-coded pictures other than the selected group of pictures.

49. The non-transitory readable medium of claim 48 wherein each group of inter-coded pictures is associated with a video program.

50. The non-transitory readable medium of claim 48 further comprising instructions which when executed by the receiver cause the receiver, wherein the compressed bit stream includes audio data associated to each group of pictures, to store the associated audio data for the group of pictures when storing at least one group of pictures.

51. A multi-program video receiver continuously receiving a compressed bit-stream that includes a plurality of groups of inter-coded pictures, each group of inter-coded pictures being associated with a video program and including at least one intra-coded image, comprising:

a means for identifying the location of each intra-coded image in the compressed bit-stream, a means for parsing the compressed bit-stream into multiple video program data streams, a means for storing at least one most recent group of pictures and identifying at least two intra-coded images having a clock reference, within the most recent group of pictures for each of the video program data streams and storing the associated audio data for each group of pictures, a means for, upon selection of a video program, decoding the new video program data stream beginning with the oldest intra-coded image having a clock reference, to display the video program data stream for the new video program and to play the associated audio, such that there is always a complete recent group of pictures and an intra-coded image available to be displayed instantly for each video program, and such that, upon the selection of a video program, there is a complete image displayed, followed immediately by full-motion video.

52. The receiver of claim 51 further comprising a means for, if a video program is first highlighted, decoding the new video program data stream from the time of highlighting, starting from a recent intra-coded image, such that when the highlighted program is selected, instant and contiguous motion video is displayed accompanied by playing the associated audio.

53. The receiver of claim 52 further comprising a means to anticipate the decoding of a group of pictures for a plurality of video program data streams in order to make a group of pictures available for the anticipated video program, the anticipation being based on one of: the direction of sequential program highlighting from a list of programs and a locality highlighted in an array of programs.

54. The receiver of claim 53 further comprising a means to highlight the new video program by highlighting one of: text means and graphical means associated with the new video program data stream.

55. The receiver of claim 51 further comprising a means to store data for at least two most recent intra-coded images for each video program data stream to ensure that at least one complete group of pictures is available for decoding to ensure contiguous motion video upon selecting a different video program.

56. The receiver of claim 51 further comprising a means to further decoding the most recent intra-coded image data from a group of video programs, and displaying these intra-coded images, as thumbnail images in a thumbnail image area on a screen, and wherein any 57. The receiver of claim 56 further comprising a means to continuously updating each video program thumbnail image with its most recent intra-coded image.

58. The receiver of claim 53 further comprising a means to decoding and displaying the associated video for each video program in the corresponding thumbnail image area with at least one of a lower resolution and a lower refresh rate, thereby displaying a corresponding thumbnail video.

59. The receiver of claim 58 further comprising, wherein a currently displayed video program is displayed on a screen, a means to arrange and to display the thumbnail videos in the perimeter of the currently displayed program video.

60. The receiver of claim 59 further comprising a means to arrange a plurality of thumbnail videos within the perimeter of the displayed video program such that the original aspect ratio of the displayed video program is maintained.

61. The receiver of claim 59 further comprising, wherein the aspect ratio of a screen and the aspect ratio of the displayed video program do not match, a means to leave unused screen area, and wherein the thumbnail videos are arranged in the unused area of the screen.

62. The receiver of claim 58 further comprising a means to initiate decoding of the data from a highlighted video program upon highlighting the corresponding thumbnail video, to ensure instant and contiguous motion video when the highlighted video program is selected.

63. The receiver of claim 58 wherein the thumbnail videos are selected from one of: user preferred video programs, sequential video programs in the data, nearest neighbor video programs in the data, and similarly classified video programs.

64. The receiver of claim 58, further comprising a means to initiate the decoding of groups of pictures from a group of video program data streams based on the direction of the movement of the selection highlight in a two-dimensional array of thumbnail videos.

65. A multi-program video receiver comprising:

a means for receiving a compressed bit-stream including a plurality of groups of inter-coded pictures having intra-coded images;

a means for identifying the location of each intra-coded image in the compressed bit-stream;

a means for parsing the compressed bit-stream into each group of the plurality of groups of inter-coded pictures having intra-coded images, a means for storing at least one of the plurality of groups of inter-coded pictures to form a stored group of pictures and identifying at least two intra-coded images having a clock reference, with a video program data stream;

a means for selecting a group of pictures from the stored group of pictures;

a means for displaying the video program data stream from the selected group of pictures, beginning with the oldest intra-coded image; and a means for maintaining at least one of the plurality of groups of inter-coded pictures other than the selected group of pictures.

66. The receiver of claim 65 wherein each group of inter-coded pictures is associated with a video program.

67. The receiver of claim 65 further comprising wherein the compressed bit stream includes audio data associated to each group of pictures, a means to store at least one group of pictures by storing the associated audio data for the group of pictures.

* * * * *